US009635110B2

(12) United States Patent
Engel et al.

(10) Patent No.: US 9,635,110 B2
(45) Date of Patent: Apr. 25, 2017

(54) METHOD AND DEVICE FOR FORWARDING INFORMATION

(71) Applicant: Volkswagen Aktiengesellschaft, Wolfsburg (DE)

(72) Inventors: Philipp Engel, Velpke (DE); Tetiana Zinchenko, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/785,115

(22) PCT Filed: Jun. 17, 2014

(86) PCT No.: PCT/EP2014/062636
§ 371 (c)(1),
(2) Date: Oct. 16, 2015

(87) PCT Pub. No.: WO2014/206800
PCT Pub. Date: Dec. 31, 2014

(65) Prior Publication Data
US 2016/0142491 A1    May 19, 2016

(30) Foreign Application Priority Data

Jun. 24, 2013 (DE) .................. 10 2013 211 952
Oct. 31, 2013 (DE) .................. 10 2013 222 174

(51) Int. Cl.
*G08G 1/00*    (2006.01)
*H04L 29/08*    (2006.01)
(Continued)

(52) U.S. Cl.
CPC ............. *H04L 67/12* (2013.01); *G08G 1/162* (2013.01); *H04B 7/15507* (2013.01); *H04B 7/26* (2013.01); *G08G 1/093* (2013.01); *H04W 84/18* (2013.01)

(58) Field of Classification Search
CPC combination set(s) only.
See application file for complete search history.

(56) References Cited

U.S. PATENT DOCUMENTS 5,899,953 A    5/1999 Urahashi ..................... 701/117
6,292,109 B1 *    9/2001 Murano ................. G08G 1/164
340/902

(Continued)

FOREIGN PATENT DOCUMENTS

CN    1161516 A    10/1997
DE    3729941    3/1989    ............... G07C 3/00
(Continued)

OTHER PUBLICATIONS

Search Report issued in corresponding Chinese Patent Application No. 201480036221.2 dated Aug. 3, 2016.
(Continued)

*Primary Examiner* — Travis Hunnings
(74) *Attorney, Agent, or Firm* — Kusner & Jaffe

(57) ABSTRACT

The invention relates to a method for forwarding information by means of a transmitting and receiving device in a first vehicle, having the following steps of: determining a stop state of the first vehicle, determining a position of the first vehicle, receiving information from a first transmitter in a vehicle and/or an infrastructure unit, forwarding the information from the first transmitter to a receiver in a second vehicle by means of the transmitting and receiving device if the position of the first vehicle is within a predefined area. The invention also relates to a device for carrying out the method.

11 Claims, 3 Drawing Sheets

(51) Int. Cl.
*G08G 1/16* (2006.01)
*H04B 7/155* (2006.01)
*H04B 7/26* (2006.01)
*G08G 1/09* (2006.01)
*H04W 84/18* (2009.01)

(56) References Cited

U.S. PATENT DOCUMENTS

| | | | |
|---|---|---|---|
| 6,654,681 B1 | 11/2003 | Kiendl et al. | 701/117 |
| 8,928,468 B2* | 1/2015 | Ullrich | G08G 1/161 340/425.5 |
| 2004/0158390 A1* | 8/2004 | Mukaiyama | G08G 1/161 701/400 |
| 2008/0186206 A1* | 8/2008 | Reumerman | G08G 1/161 340/902 |
| 2013/0127638 A1* | 5/2013 | Harrison | G08G 1/166 340/903 |
| 2013/0279695 A1* | 10/2013 | Rubin | G08G 9/02 380/255 |
| 2014/0126557 A1 | 5/2014 | Kasslatter et al. | 370/336 |

FOREIGN PATENT DOCUMENTS

| | | | |
|---|---|---|---|
| DE | 19817009 | 10/1999 | G01S 13/74 |
| DE | 19903909 | 8/2000 | G08G 1/00 |
| DE | 102008015046 | 9/2008 | B60W 20/00 |
| DE | 102008052382 | 4/2010 | H04L 12/28 |
| DE | 102009054795 | 9/2010 | G08G 1/0965 |
| DE | 102011010846 | 8/2012 | H04B 7/26 |
| DE | 102012009238 | 11/2012 | B60W 30/14 |
| DE | 102011077882 | 12/2012 | H04W 84/18 |
| WO | WO 2006/072850 | 7/2006 | H04L 12/56 |
| WO | WO 2008/113836 | 9/2008 | B60W 30/18 |

OTHER PUBLICATIONS

International Search Report from corresponding International Patent Application No. PCT/EP2014/062636, dated Nov. 6, 2014.
German Search Report from corresponding German Patent Application No. DE 102013222174.6, dated Mar. 24, 2014.

* cited by examiner

METHOD AND DEVICE FOR FORWARDING INFORMATION

FIELD OF THE INVENTION

The invention is directed at a method for forwarding information by means of a transmission and reception device that is situated in a first vehicle. In addition, the invention relates to an apparatus for forwarding information.

BACKGROUND OF THE INVENTION

Today, vehicles have communication services that allow information to be exchanged between vehicles themselves or between vehicles and infrastructure units. By way of example, infrastructure units are traffic lights or other communication units that transmit information about a traffic light phase or information about a building that is worth seeing or about free parking spaces. Other examples of information that can be sent by an infrastructure unit or a vehicle are an accident report, a vehicle with blue lights activated, a fast vehicle approaching a junction, etc.

In the prior art, the document WO 2006072850 A1 describes an apparatus and method for forwarding warning messages between vehicles in particular hazard situations.

The document DE 10 2009 054 795 A1 is known from the prior art. It describes a mobile communication module in a vehicle that can send vehicle-to-X messages to neighboring vehicles and is additionally capable of communicating with a control unit installed in the vehicle in order thereby to interchange data for the messages with the control unit.

The document DE 10 2011 010 846 A1 describes a method for line-of-sight-independent data transmission from a transmitter to a receiver in a car-to-car or car-to-infrastructure communication system.

The document DE 10 2008 052 382 A1 describes a method for forwarding messages in a space that is restricted for the purposes of radio, particularly in the case of what is known as car-to-X communication. This involves messages being forwarded by stations, the stations being both the transmitters and receivers of messages. It involves each receiving station that is located within a range of a sending station automatically ascertaining a respective position within the range of the sending station from a signal strength of the received messages. The received messages are then intended to be forwarded only by that receiving station that establishes that it is located at the edge of the range of the sending station. This station located at the edge of the range of the sending station is the best candidate for forwarding a message quickly and reliably, with congestion on a radio channel additionally being avoided and resources saved.

SUMMARY OF THE INVENTION

The invention is based on the object of providing a method that reliably forwards information to a receiver. In addition, the object includes providing a corresponding apparatus.

This object is achieved by an inventive method and by an apparatus for carrying out the method, according to the independent claim(s). Further advantageous embodiments of the invention can be found in the subclaims.

The invention relates to a method for forwarding information by means of a transmission and reception device that is situated in a first vehicle, having the following steps:
 determination of a stopped state for the first vehicle,
 determination of a position for the first vehicle,
 reception of information from a first transmitter of a vehicle and/or an infrastructure unit,
 forwarding of the information from the first transmitter by means of the transmission and reception device to a receiver in a second vehicle when the position of the first vehicle is within a prescribed region.

It is in accordance with the invention if the first transmitter is situated in a charging station, for example for charging vehicles with electric power. According to the invention, the first transmitter may be any kind of infrastructure unit, such as traffic lights, a filling station, etc.

It is in accordance with the invention for the prescribed region to be determined from a distance of the first vehicle from a first road, and from a distance of the first vehicle from a second road, the second road leading to the first road. In other words, "leading to" means that a vehicle can drive from the second road to the first road. By way of example, the prescribed region is a junction in proximity to which the first vehicle is parked, that is to say is in the stopped state at that location. By way of example, the distance is determined from two imaginary lines that are arranged in the middle of the two intersecting roads and the centers of which form the center of the junction (centerlines). Starting from these lines, a reference distance of approximately 20 meters, in each case parallel to the centerlines, is chosen, said reference distance again being represented by an imaginary line (reference line). If the parked vehicle is now situated within the first zone, which is formed from an imaginary centerline of the first road and an imaginary first reference line, and is simultaneously situated in a zone that is formed from an imaginary centerline of the second road and an imaginary second reference line, then the vehicle is situated within the prescribed region. In other words, the prescribed region is determined by a geometric area within which at least two roads that meet one another are situated.

In a particularly advantageous embodiment of the invention, the prescribed region is ascertained from the position of the transmission and reception device of the first vehicle in relation to the first transmitter and in relation to a second transmitter in the second vehicle. The first transmitter and the second transmitter send their position information continuously. The position of the first vehicle is ascertained by means of a system for position finding, such as GPS or Galileo, so that the distances of the transmission and reception device from the two transmitters are ascertained. If these distances are shorter than 500 meters, for example, then the position of the first vehicle is in the prescribed region. In other words, the prescribed region obtains when the distance of the transmitters from the transmission and reception device is less than a prescribed value. The position also means that the imaginary angle between the transmission and reception device and the first transmitter and between the transmission and reception device and the second transmitter in the second vehicle is less than 120 degrees, for example. If this is the case, which is likewise ascertained by means of the position data from the transmitters and the transmission and reception device, then the first vehicle is situated in the prescribed region. The transmission and reception device is provided with a computation device and an appropriate algorithm that is equipped so as to convert the received position data and to determine the cited positions in relation to one another, such as distances and/or angles. Ideally, the distances and angles are used to determine that the first vehicle is situated in the prescribed region.

In a further advantageous embodiment of the invention, the first transmitter and the second transmitter in the second vehicle send at least position information, speed information and direction of movement information, the latter being vector information, for example. This information is used to determine the positions of the transmitters in relation to the transmission and reception device. Particularly the direction of movement information is used to determine whether the second vehicle moves toward or away from the transmission and reception device. If it moves away from the transmission and reception device, for example, this information is not used for evaluation. The position information can contain further information, such as warnings, so that this information is forwarded.

In a further embodiment of the invention, it is advantageous if the prescribed region is taken from a digital map. This involves, by way of example, areas around a junction region or the junction region being stipulated as an area on a digital map and stored at that location, so that the position information from the first vehicle is used to establish that the vehicle is situated in the prescribed region when the position information is determined as being within a prescribed area. This is accomplished using an algorithm, for example, that compares the coordinates of the area or of the areas with the position coordinates.

It is in accordance with the invention that the information is forwarded by the transmission and reception device of the first vehicle when at least one electrical energy source in the first vehicle is made available. In particular, it is advantageous for the energy source to be comprised of solar cells. The vehicle is therefore capable of supplying solar power to the transmission and reception device.

When the solar power is not available, it is particularly advantageous for the vehicle battery then to be made available as an energy source for the transmission and reception device. The solar cell, which is comprised of a multiplicity of solar cells, may be covered by a shadow, so that the necessary power for sending and receiving in the first vehicle is not sufficient. A computation device, which may also be in a controller, establishes the power of the energy source continuously and changes over the battery when the solar cell does not provide sufficient power.

When the battery of the vehicle is used as an energy source for the transmission and reception device, it is necessary to ensure that starting of the vehicle is guaranteed. For this reason, when a stipulated state of charge for the battery, for example 50%, is reached, the transmission and reception device of the first vehicle is not operated further, that is to say is shut down. Accordingly, the transmission and reception device does not forward information when the state of charge is below a prescribed limit value.

In addition, the invention has an apparatus for forwarding information from the inventive method described and the embodiments thereof and/or a combination of the advantageously described embodiments.

An inventive apparatus contains at least one transmission and reception device that is connected to at least one antenna, and also to a position finding device, such as Galileo or GPS, having a digital map. In addition, an apparatus for carrying out the method contains at least one computation device that is integrated in the transmission and reception device. In addition, the apparatus has at least one sensor that is used or can be used to ascertain a stopped state. By way of example, the sensor is integrated in a locking system of the vehicle. The apparatus is embodied such that it can carry out, or does carry out, the cited inventive methods.

The inventive examples that are cited above and also claimed and are described in the exemplary embodiments are not subject to any particular exceptions for their size, shape, design and technical concepts, which means that the selection criteria known in the field of application can be used without restriction.

BRIEF DESCRIPTION OF THE DRAWINGS

Further details, features and advantages of the subject matter of the invention will emerge from the subclaims and from the description below of the associated figures, which presents a preferred exemplary embodiment of the invention. In the figures:

DETAILED DESCRIPTION OF THE INVENTION

Figure 1:
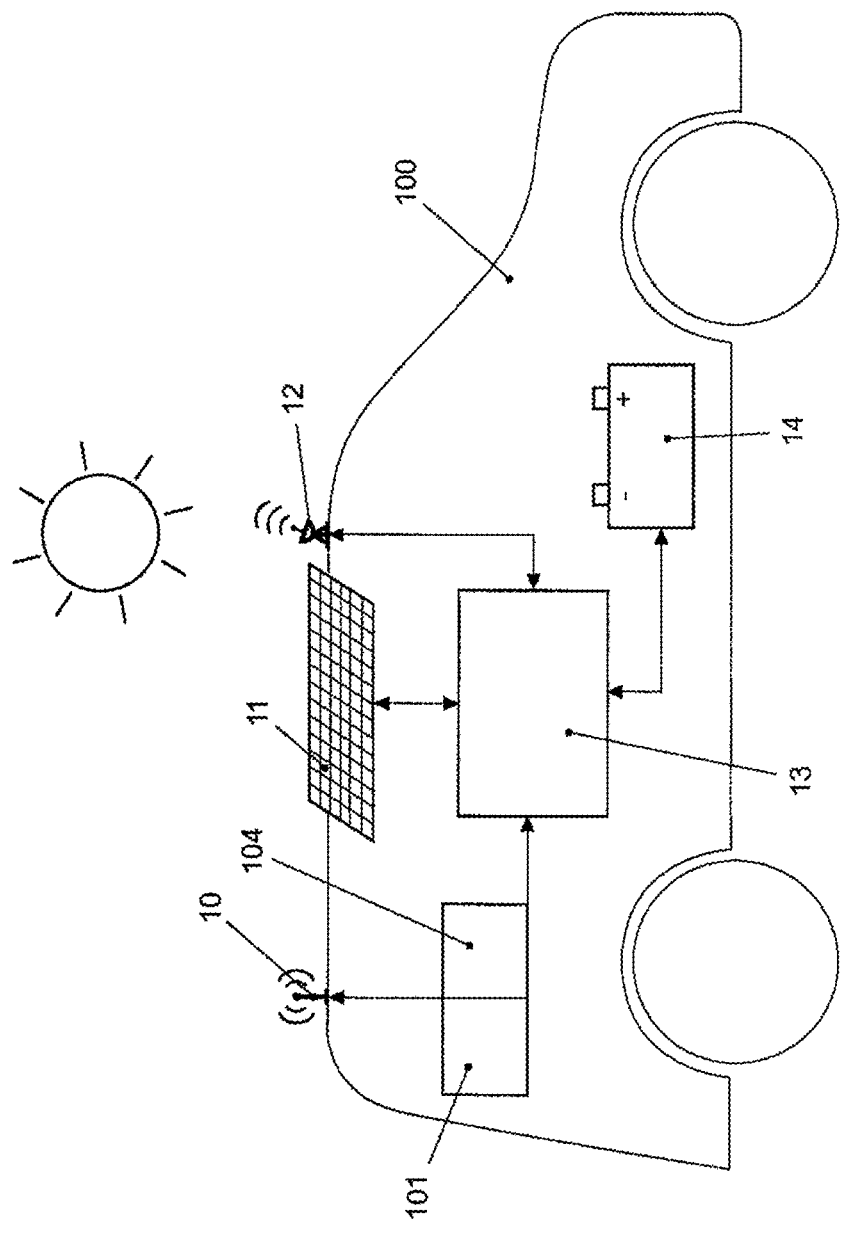
FIG. 1 schematically shows a representation of a vehicle for forwarding information, FIG. 2 schematically shows a plan view of a use scenario, and FIG. 3 schematically shows a representation of a method for forwarding information.

In an advantageous exemplary embodiment, FIG. 1 shows a schematic representation of a vehicle 100 with an apparatus for forwarding information. The apparatus has an antenna 10 for receiving and forwarding information, a system for position finding 12, at least one energy source 11, 14 and a computation device 13. The energy source is a solar cell 11 and/or a battery 14 or another energy store or energy generator that generates or provides electric power when the vehicle is not moving.

The system for position finding 12 is preferably a navigation system with GPS (global positioning system) and a digital map as known in the prior art.

In a preferred embodiment, the solar cell 11 is arranged on the roof of the vehicle 100 and can supply the inventive apparatus with power directly and via a battery 14. As known in the prior art, the solar cell 11 as an energy generator converts the energy and the light from the sun into electric power.

The computation device 13 undertakes various functions. It processes the information received by the antenna 10 and routes to the antenna 10 information that is intended to be sent. The computation device 13 uses an algorithm to prioritize the information. In this way, not all information is forwarded, in order to keep the computation capacity of the computation device and the power requirement as low as possible. The prioritization is also, alternatively or additionally, effected according to the importance of the information. Information from an emergency vehicle (for example blue lights operating, accident, hazard) has higher priority than queue reports or other information. The computation device 13 evaluates the information received by the system for position finding 12 in order to determine the position of the first vehicle 100. Furthermore, the computation device 13 determines the availability of the solar source 11 and/or the battery 14 as an energy source in order to safeguard the supply of power for forwarding information, availability also meaning that the computation device determines the power provided by the energy source.

By way of example, the controller ascertains that the solar cell 11 is not available as an energy source during darkness. This is the case when the vehicle is situated under a roof (for example in a parking garage, an underground garage, a tunnel, etc.) in the stopped state, or when there is snow on the roof of the vehicle. The battery 14 is not available as an energy source when its state of charge is lower than a predetermined parameter, such as a state of charge.

The computation device additionally uses signals that are supplied to it by means of a data line, such as a CAN bus, to ascertain that the vehicle is in a stopped state. This is accomplished particularly by means of signals that indicate that a vehicle has been secured and/or by means of a signal from an engine controller that sends the off state. In addition, the signal from a vehicle in the stopped state can be ascertained by means of a start/stop switch that has been deactivated, so that the vehicle is in the stopped state. In addition, a stopped state can be provided by means of a speed sensor that ascertains the speed zero km/h for the vehicle. These refinements are not shown in FIG. 1.

Figure 2:
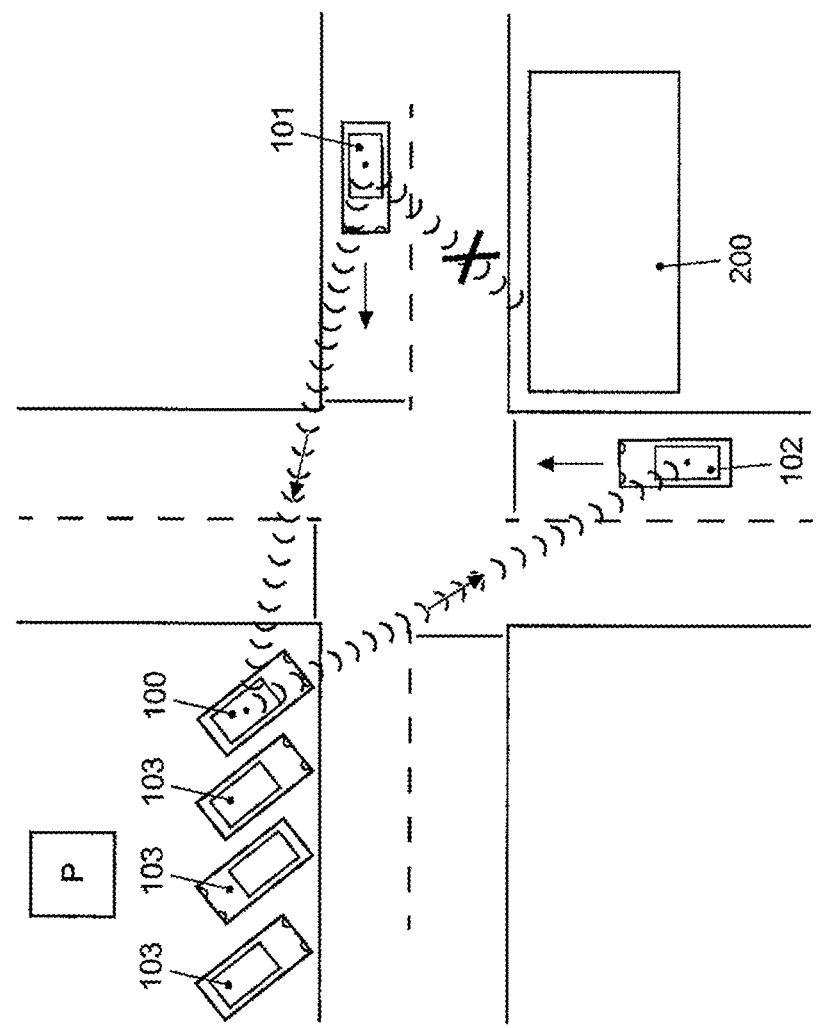

FIG. 2 schematically shows a possible use scenario as an exemplary embodiment. A vehicle 101 having a first transmitter travels in the direction of a junction on a first road. On a second road, a second vehicle 102 having a receiver likewise travels toward this junction. A building 200 disrupts or prevents direct car-to-car (vehicle-to-vehicle) communication between the first transmitter of the vehicle 101 and the receiver of the second vehicle 102. Since the vehicle 101 having the first transmitter travels toward the junction at high speed, a warning message is produced and output by the vehicle 101. Owing to the building, this information cannot be received by the receiver of the second vehicle 102.

It is particularly advantageous for the parked vehicle 100 to receive the warning message, through car-to-car communication, by means of the transmission and reception device 104 (located in parked vehicle 100) and to evaluate and prioritize it using the computation device 13 (located in parked vehicle 100). When identified as relevant, this information is forwarded by transmission and reception device 104 of parked vehicle 100 to the receiver of the second vehicle 102. This ensures that the warning information reaches the receiver in the second vehicle 102.

In an advantageous exemplary embodiment, the parked vehicle 100 communicates with further parked vehicles 103 in the surroundings of its position after it has been parked. Both the first parked vehicle 100 and the further parked vehicles 103 ascertain their position by means of systems for position finding. The car-to-car communication of the position data in conjunction with data from digital maps ascertains which vehicle has the best position in relation to this junction. The junction with particular zones is a prescribed region. In this case, the best position is the shortest distance from the center of the junction. The prescribed region is available in the map information from the respective vehicle 100, 103. In other words, prioritization can be performed between a plurality of possible vehicles 100, 103 that are in a prescribed region, so that a vehicle having the highest priority among the plurality of possible vehicles is responsible for forwarding information to the second vehicle 102. The advantage is that the other vehicles (i.e., the lower priority vehicles) are put into an idle mode in order to consume as little power as possible.

According to a further exemplary embodiment, which is not illustrated here, the best position in a prescribed region is the position that has a greater height. If two vehicles are above one another in a parking garage, for example, the vehicle that is higher in relation to the earth's surface has the best position. The height information can be ascertained by GPS and/or a digital map and an inclination sensor. Further methods for determining height are known from the prior art.

In a preferred embodiment, the communication between the first transmitter 101 and the transmission and reception device 104 of the first vehicle 100, between the transmission and reception device 104 of the first vehicle 100 and the transmitter and receiver of the second vehicle 102, and between the transmission and reception device 104 of the first vehicle 100 and further vehicles 103 takes place using radio technologies such as UMTS, GPRS, wireless LAN based on the IEEE 802.11 Standard.

Figure 3:
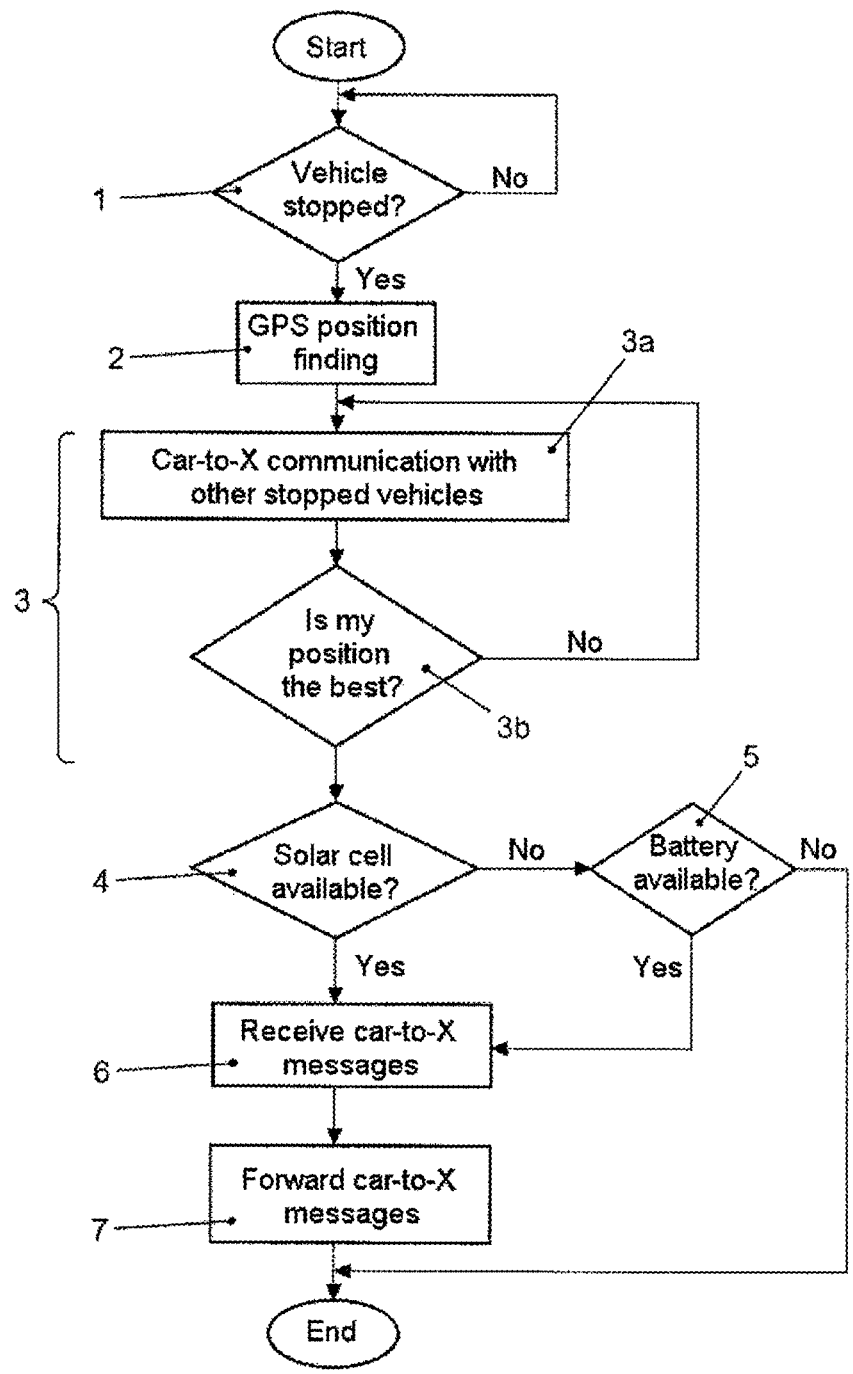

FIG. 3 shows a schematic representation of the inventive method for forwarding information.

The system must be activated, which is represented by the start condition. This can be a setting that is preset in the vehicle, but said setting can also be activated by the vehicle driver using an operator control element.

In the first method section 1, the controller ascertains whether the vehicle 100 is in a stopped state. This method section takes place continuously. When a stopped state is detected, the position is determined by a system for position finding (in this case GPS 12) and a digital map. This information is output directly to the surroundings in method section 3a in order to ascertain whether the vehicle 100 occupies the best position in relation to other vehicles 103 in the stopped state that are likewise in a prescribed region. This step likewise takes place continuously. If another vehicle 103 has the best position 3b in the prescribed region, that is to say is positioned closer to the center of the junction, for example, it is ensured that this vehicle 103 then forwards information, that is to say becomes the first vehicle 100. If the position is not the best, position information continues to be sent continuously. This is advantageous if, when a vehicle that had the best position in the prescribed region is removed, the vehicle communicates with the vehicles in the stopped state and it is established which vehicle has the best position in the prescribed region. If the vehicle is in the best position 3b, it is established whether there is sufficient electric power available to allow reception and forwarding. If the vehicle 100 has solar cells 11 as an energy source, a check is performed to determine whether said solar cells provide sufficient electric power. If this is not the case, a check is performed in step 5 to determine whether a vehicle battery 14 is available as an energy source. If there is no energy source available to allow the forwarding of information, the process is terminated. If there is sufficient electric power available, information is received in method step 6 and forwarded in method step 7. When the vehicle is started up again and moved from the stopped state, the transmission of information ends.

By way of example, a stopped state is slow driving in a queue or stopping in a queue or stopping at a red traffic light or stopping to load and unload.

Alternatively, method step 3 can also be inserted between steps 4 and 6, so that first of all a check is performed to determine whether there is an energy source available before further method steps are initiated.

LIST OF REFERENCE SYMBOLS

100 First vehicle
101 First transmitter
102 Second vehicle with a transmitter and receiver
103 Further vehicle
104 Transmission and reception device
200 Building (disruptive facility for the transmission of information)
11 Solar cell; energy source
12 System for position finding
13 Computation device
14 Battery; energy source Having described the invention, the following is claimed:

1. A method for forwarding information by means of a transmission and reception device that is located in a first vehicle, said method comprising:
   determining whether the first vehicle is in a stopped state,
   determining a position for the first vehicle when the first vehicle is determined to be in the stopped state,
   receiving information at the transmission and reception device located in the first vehicle, said received information transmitted by a first transmitter of a vehicle and/or an infrastructure unit, and
   forwarding the received information to a receiver located in a second vehicle by means of the transmission and reception device located in the first vehicle, when the first vehicle is determined to be in the stopped state and the position of the first vehicle is determined to be within a prescribed region.

2. The method as claimed in claim 1, wherein the method includes determining the prescribed region from (i) a distance of the first vehicle from a first road, and (ii) a distance of the first vehicle from a second road, the second road leading to the first road, wherein said distances are determined using the position determined for the first vehicle.

3. The method as claimed in claim 1, wherein the method includes determining the prescribed region from the position of the transmission and reception device located in the first vehicle (i) in relation to the first transmitter of the vehicle and/or the infrastructure unit and (ii) in relation to a second transmitter located in the second vehicle, wherein the position of the transmission and reception device is determined from the position determined for the first vehicle.

4. The method as claimed in claim 3, wherein the method includes:
   transmitting position information, speed information, and direction of movement information of the vehicle and/or infrastructure unit using the first transmitter, and
   transmitting position information, speed information, and direction of movement information of the second vehicle using the second transmitter.

5. The method as claimed in claim 1, wherein the prescribed region is determined using a digital map.

6. The method as claimed in claim 1, wherein the step of forwarding the received information to the receiver located in the second vehicle occurs when at least one electrical energy source in the first vehicle is made available.

7. The method as claimed in claim 6, wherein the energy source is comprised of solar cells.

8. The method as claimed in claim 7, wherein the energy source used for forwarding the received information to the receiver located in the second vehicle includes at least one battery when the solar cells are not made available as an energy source.

9. The method as claimed in claim 8, wherein the transmission and reception device located in the first vehicle does not forward the received information when the state of charge of the at least one battery is below a prescribed limit value.

10. An apparatus for carrying out the method as claimed in claim 1.

11. The method as claimed in claim 1, wherein the first vehicle has a highest priority among a plurality of vehicles located in the prescribed region, each of said plurality of vehicles having a respective transmission and reception device, wherein the highest priority is determined by having a shortest distance between a position of the vehicle and a center of a junction of at least two roads within the prescribed region.

* * * * *